(12) United States Patent
Fumez

(10) Patent No.: US 6,871,461 B2
(45) Date of Patent: Mar. 29, 2005

(54) MANUFACTURE AND METHOD OF INSTALLING, NOTABLY CONSTRUCTION PANELS FORMED IN A CLOSED MOLD

(75) Inventor: Didier Fumez, Bons en Chablais (FR)

(73) Assignee: Groupe P.A.D.F., Inc., Boucherville (CA)

( * ) Notice: Subject to any disclaimer, the term of this patent is extended or adjusted under 35 U.S.C. 154(b) by 98 days.

(21) Appl. No.: 09/958,469

(22) PCT Filed: Feb. 7, 2001

(86) PCT No.: PCT/FR01/00352

§ 371 (c)(1),
(2), (4) Date: Feb. 11, 2002

(87) PCT Pub. No.: WO01/59226

PCT Pub. Date: Aug. 16, 2001

(65) Prior Publication Data

US 2002/0157347 A1 Oct. 31, 2002

(30) Foreign Application Priority Data

Feb. 9, 2000 (FR) .......................................... 00 01679

(51) Int. Cl.$^7$ ................................................ E04B 1/38
(52) U.S. Cl. ...................... 52/285.2; 52/284; 52/285.1; 52/309.8
(58) Field of Search ............................... 428/304.4, 71, 428/72; 52/284, 285.1, 285.2, 309.8

(56) References Cited

U.S. PATENT DOCUMENTS

| | | | |
|---|---|---|---|
| 3,402,520 A | | 9/1968 | Lee et al. ...................... 52/309 |
| 3,554,276 A | * | 1/1971 | Stallkamp .................... 165/168 |
| 3,707,165 A | | 12/1972 | Stahl ............................ 137/594 |
| 3,811,593 A | * | 5/1974 | Bridges et al. ......... 220/560.07 |
| 3,866,380 A | * | 2/1975 | Benson ....................... 52/656.6 |
| 4,102,099 A | * | 7/1978 | Gross et al. ................ 52/171.3 |
| 4,138,283 A | | 2/1979 | Hanusa ......................... 157/77 |
| 4,186,530 A | * | 2/1980 | Fraioli ........................ 52/2.25 |
| 4,513,041 A | * | 4/1985 | Delluc .......................... 428/69 |
| 5,500,305 A | * | 3/1996 | Bridges et al. ............. 428/621 |
| 5,853,512 A | | 12/1998 | McKinney .................... 156/78 |

* cited by examiner

Primary Examiner—Allan R. Kuhns
(74) Attorney, Agent, or Firm—Baker Botts LLP

(57) ABSTRACT

The present invention concern the fabrication of panels (11) (12) in which the elements (2) are assembled by gussets (3) (13) during the preparation in the mold.

A porous facing (5) constituting an external side that allows degassing (6) that is a result of the expansion of reactive products. The porous surface facing (5) is only impregnated (7) leaving the external surface of the panel rough for the future application of a coating.

The present invention allows for a perfect water tight seal (11) (12) between the panel, the ground and the frame with junction profile (16) and a tube for the injection of products (18) with no cavities to be filled-up after set-up.

6 Claims, 6 Drawing Sheets

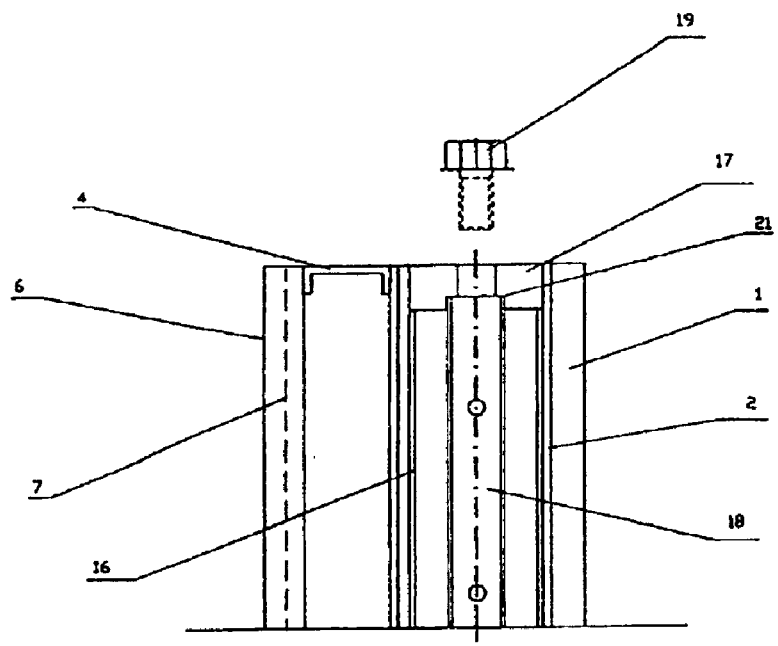
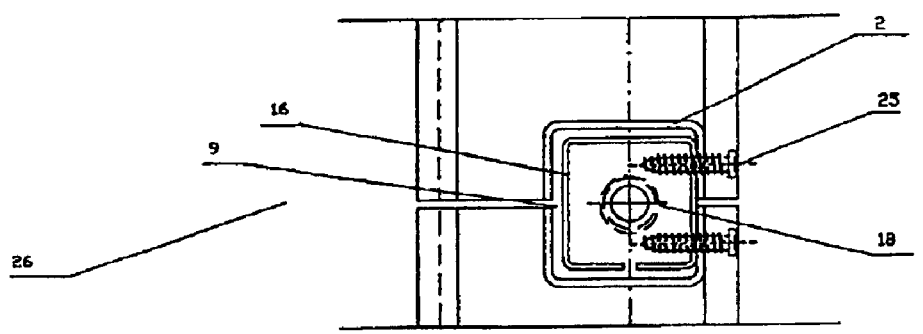
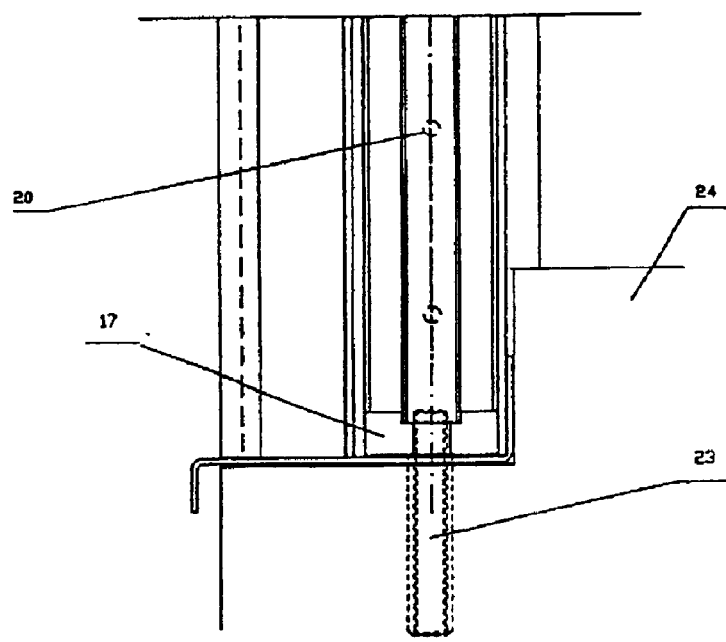

Fig. 7
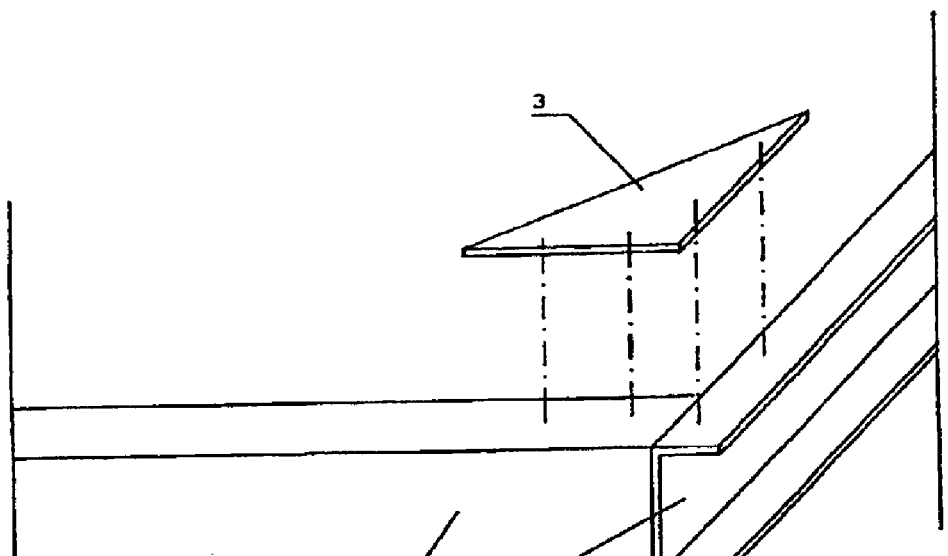
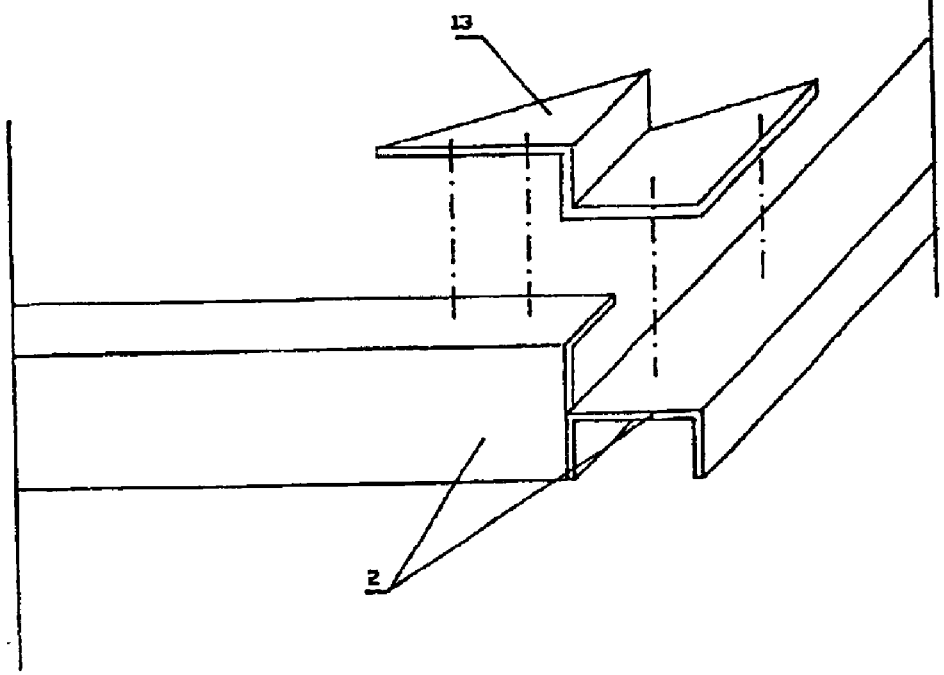

MANUFACTURE AND METHOD OF INSTALLING, NOTABLY CONSTRUCTION PANELS FORMED IN A CLOSED MOLD

The present invention concerns in general the concept and the on site set-up of insulated, weather-proof panels for construction.

It is generally known that the fabrication of panels in molded form does not present particular difficulty as long as these panels are not made with the aid of expandable products, in this instance, vents for the degassing of air are required, allowing the excess air to be driven out by the expansion of the foaming agents, a delicate operation.

The linking of the panels between themselves, in the set-up process is extremely complex and requires the presence of grooves for mechanically linking two panels. It is also necessary to fill these grooves after building the elements on the construction site.

It is also common that the connection between the ground and the panels is generally realised by incorporating metallic inserts during fabrication of the concrete slab, or otherwise reserved areas, that specify the precise positioning that is not always respected, being seen to be outside of the rules of the art.

It is also known that panel erected this way allows linking to the upper part of the frame elements, but the stresses between the ground and the frame are transmitted only by the panel elements themselves. This technique does not permit a guarantee against a lifting of the frame during unfavorable climatic conditions.

The present invention concerns the seamless manufacture of a panel as well as the placing of these, without having to resort to any grooves in order to guarantee a connection between the ground and the frame elements, within the rules of the art. The connection between panels also makes possible a later filling of the cavities.

The present invention is characterized by the manufacture of a panel in a mold dimensioned to contain the elements inserted in this molding:

1) A sheet of wallboard (1) or other on the bottom of the mold.
2) metal profiles (2) forming the frame of the panel (10) this frame (2) is assembled into the mold itself, with the aid of metal gussets (3) anchored by spot-welding or metallic screws (15), that approach avoids the handling of the profiles (2) previously carried out with difficulty.
3) profiles (4) in synthetic materials for protection of the panel edges during set-up, these profiles simply laying on the metal profiles (3) maintaining the fiber plate (5) at a respectable distance.
4) jackets (8) along each external side for the future installation of various piping.
5) a sheet of wood-fibres (5) in this case, not bonded tightly is then placed on the synthetic profiles (4) thereby closing the frame of the panel before closing the mold and injecting the expandable products.
6) the injection of expandable reactive products (9) which after polymerization, function to fill the cavity, completely bonding all the components comprising the future panel. The panel, thereby becoming one part (contiguous) and very strong is removed from the mold.

The present invention is characterized by the fact that the plate is not air tight, allowing the evacuation of the excess air (6) while allowing the impregnation of part (7) of the thickness of the plate (5), by the expandable material (9).

The panel presents a rough outside exterior for the future application of a polymeric cement surface coating, on the building site.

The present invention offers the advantage of equally fabricating straight (11) or angled (12) elements by following the same technique, the external profiles (2) of the future panel are positioned in the mold perpendicularly to the face of the panel and themselves assembled by the appropriate metal gussets (13). This avoids the need for angle beams for the panel set-up.

The panels obtained in this manner are entirely closed on all their edges, the longitudinal side is in the form of a U shape for connecting the panels.

The present invention relates to the method of using the panels. At the end of junction tube (16) are welded metal pieces (17) comprising a thread (22) and a face (21). This junction tube (16) is incorporated into the profiles (2) forming edges in the form of a U shape on the bottom side of the panels (17), the connection to the tube is fixed with expansion bolts (23), rendering the tube (16) and the masonry (24) solid without having reserved niches linked to the ground (foundation).

PVC tube (18) is positioned inside the junction tube (16), and is itself maintained by fitting in the surface (21) of metal pieces (17).

The second panel is also encased at the linking tube (16), and solidified by metal screw (25) crossing the profile (2) and the linking tube (16). This assembly thereby attaches the two panels to the ground.

The present invention is characterized by the chemical foam that links the panels together. The PVC tube (18) positioned inside the linked panels, has holes (20) well spread along it's length, allowing the distribution of foam product (9) on (into) the connecting assembly of the two panels. The injection is made at the upper part of the connecting tube (16) across drilled plate (17), expansion being controlled by the position of the nut (19) screwed onto the plate (17).

The present invention allows for a chemical mechanical connection between panels insensitive to weathering and stress. The injection to the interior of the tubes (18) can be made soon after the installation of the two panels or later without any problem.

The present invention assures a very strong link between the ground and the frame, made possible by the connecting tube (16) attached to the upper and lower part by bolting onto the plates (17).

The present invention allows one to obtain an assembly of strong beams at each end of the panel, through the solid construction of the profiles (2) and the connecting tube (16) the beam for the angle (12) being of the same concept as the straight coupling beams (11).

BRIEF DESCRIPTION OF THE DRAWINGS

FIG. 2 represents: horizontal section (line) of a right connected panel

FIG. 3 represents: vertical section (view) of the bottom of the panel

FIG. 7 represents: frame fabrication—angled and straight

Figure 4:
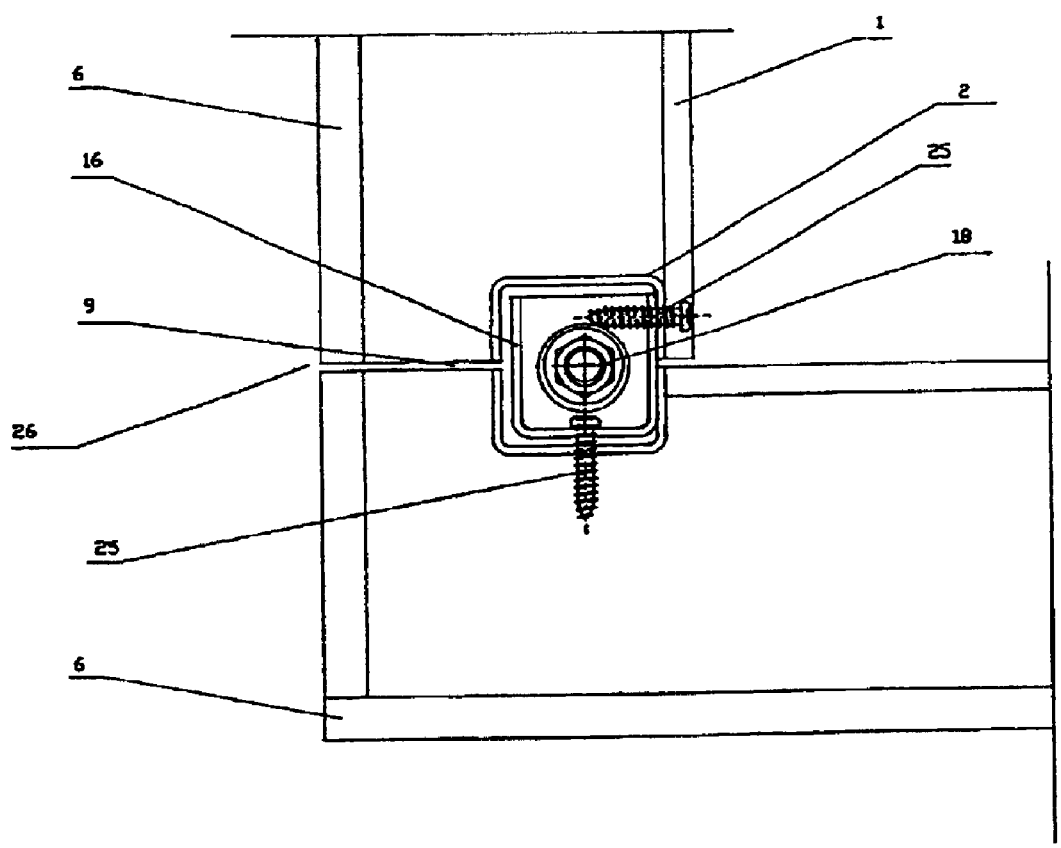
FIG. 4 represents: horizontal section (view) of angled panels
Figures 1, 5:
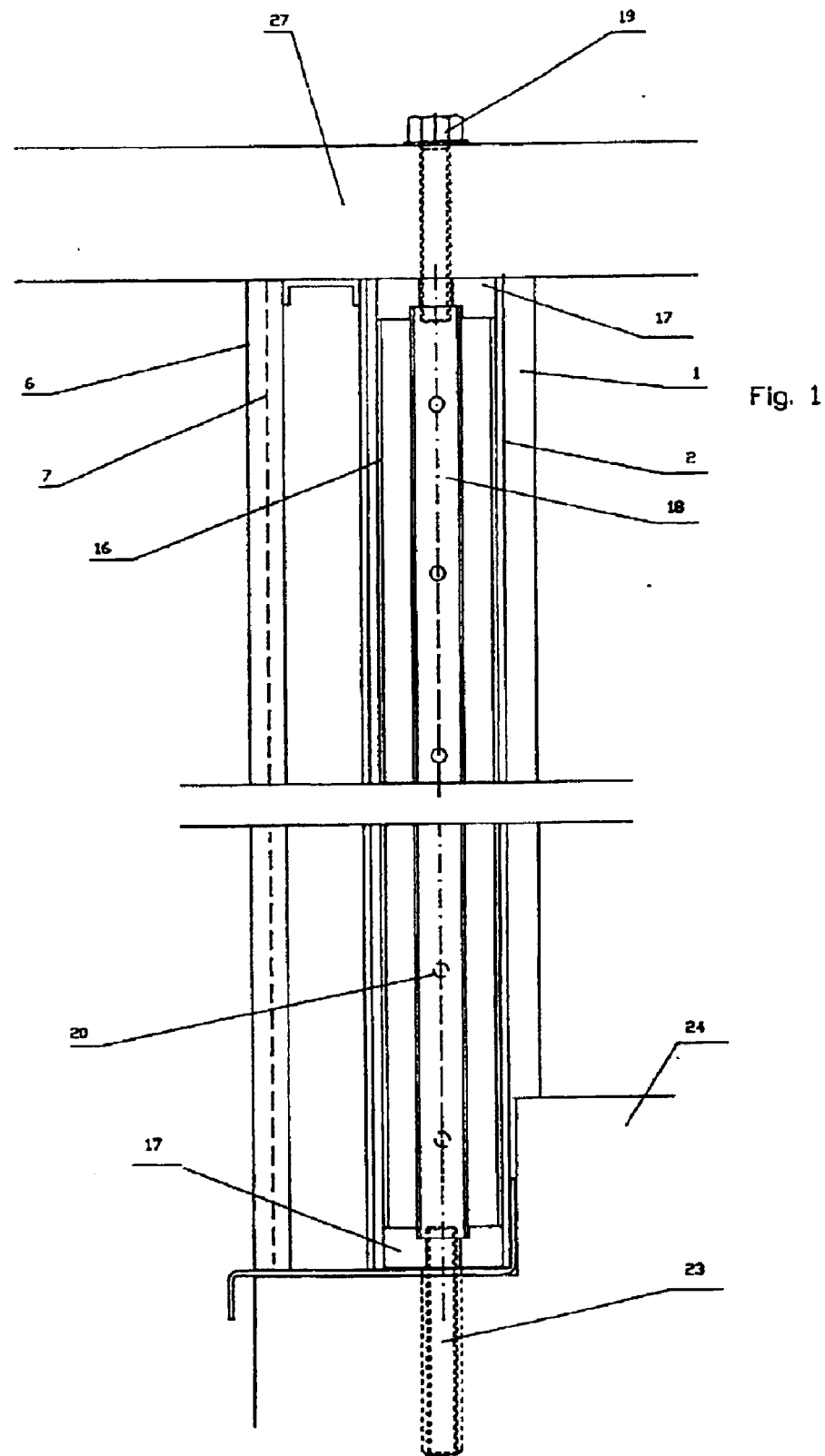
FIG. 1 represents: vertical section (line) of the panel
FIG. 5 represents: vertical section (view) of panel linked to ground and frame
Figure 6:
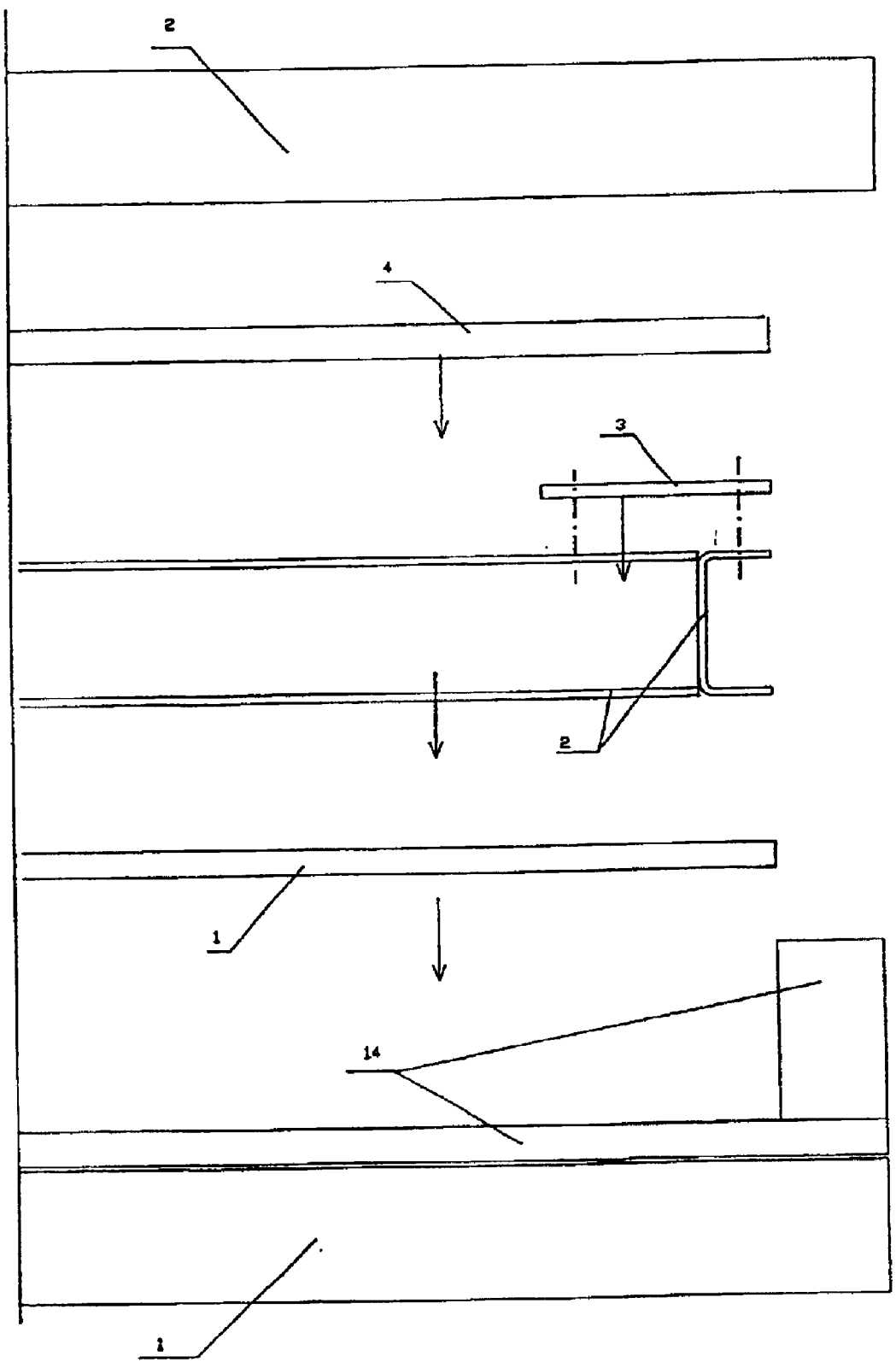
FIG. 6 represents: the pour in place (view) of the panel components in the mold
Figure 8:
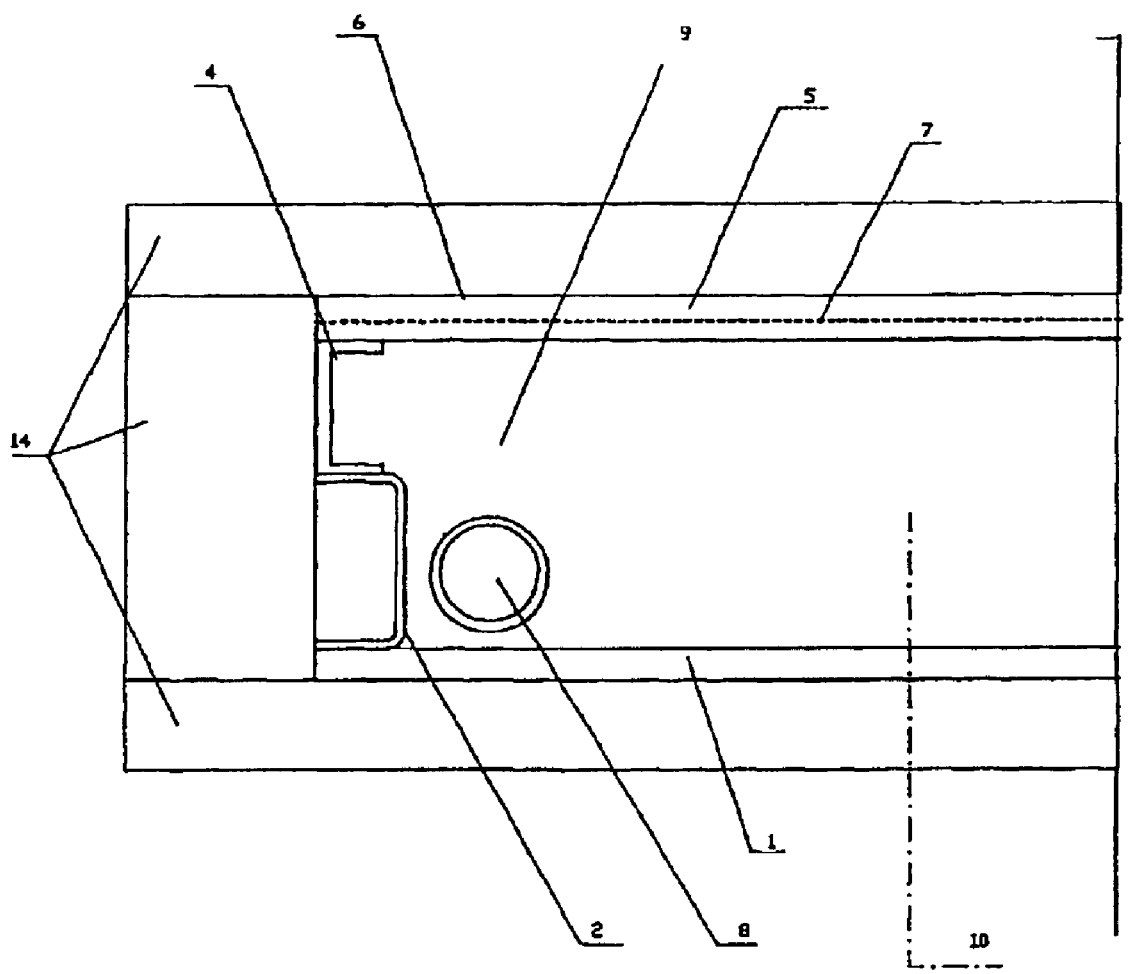
FIG. 8 represents: a section (view) of a panel type

What is claimed is:

1. An insulating system comprising at least two insulating panels connected along one edge thereof, wherein each panel comprises a profile, the profile of the panels delimiting a space containing a junction tube secured to the profiles, the space being filled by an expandable material, wherein the junction tube comprises at one extremity thereof a metallic element secured by screwing to a masonry element.

2. Insulating system as claimed in claim 1, wherein the profiles are in the form of a U.

3. Insulating system as claimed in claim 1, wherein the junction tube comprises a tube comprising openings through which the expandable material is introduced.

4. An insulating system comprising at least two insulating panels connected along one edge thereof, wherein each panel comprises a profile, the profile of the panels delimiting a space containing a junction tube secured to the profiles, the space being filled by an expandable material, wherein each panel comprises a plate, metallic profiles in contact with said plate and forming a frame, profiles made of synthetic matter forming with the metallic profiles the edges of the panel, and an impermeable plate in contact with the profiles made of synthetic material, the space delimited by the plates and the profiles being filled by an expandable material which after polymerization secures the plates and the profiles to each other.

5. Insulating system as claimed in claim 4, wherein a portion of the impermeable plate is impregnated by the expandable material.

6. Insulating system as claimed in claim 4, wherein the space comprises at least one sheath adapted to receive at least one channel.

* * * * *